United States Patent [19]

Zimmer et al.

[11] Patent Number: 4,733,576
[45] Date of Patent: Mar. 29, 1988

[54] MULTI-PURPOSE INDUSTRIAL ROBOT

[75] Inventors: Ernst Zimmer, Friedberg; Karl L. Binder, Kissing, both of Fed. Rep. of Germany

[73] Assignees: Kuka Schweissanlagen; Roboter GmbH, both of Augsburg, Fed. Rep. of Germany

[21] Appl. No.: 915,070

[22] PCT Filed: Dec. 10, 1985

[86] PCT No.: PCT/EP85/00689
§ 371 Date: Aug. 27, 1986
§ 102(e) Date: Aug. 27, 1986

[87] PCT Pub. No.: WO86/04009
PCT Pub. Date: Jul. 17, 1986

[30] Foreign Application Priority Data

Dec. 28, 1984 [DE] Fed. Rep. of Germany ....... 3447701

[51] Int. Cl.$^4$ ............................................. G05G 11/00
[52] U.S. Cl. ..................................... 74/665 L; 901/23; 901/25
[58] Field of Search .......................... 74/665 L, 665 N; 474/89, 112; 901/23, 25, 48, 46

[56] References Cited

U.S. PATENT DOCUMENTS

| 1,218,686 | 3/1917 | Morse | 474/89 X |
|---|---|---|---|
| 4,235,567 | 11/1980 | Pilch | 414/694 |
| 4,505,166 | 3/1985 | Tessar | 74/479 |
| 4,557,662 | 12/1985 | Terauchi et al. | 901/23 X |
| 4,568,238 | 2/1986 | Hirano et al. | 901/23 X |
| 4,610,598 | 9/1986 | Homada et al. | 901/25 X |
| 4,620,830 | 11/1986 | Tsuchihasi et al. | 901/23 X |
| 4,636,138 | 1/1987 | Gorman | 901/23 X |

FOREIGN PATENT DOCUMENTS

| 0054763 | 6/1982 | European Pat. Off. . |
|---|---|---|
| 0078522 | 5/1983 | European Pat. Off. . |
| 0096634 | 12/1983 | European Pat. Off. . |
| 0118845 | 9/1984 | European Pat. Off. . |
| 2228598 | 1/1974 | Fed. Rep. of Germany . |
| 3115061 | 2/1982 | Fed. Rep. of Germany . |
| 3048067 | 8/1984 | Fed. Rep. of Germany . |
| 3310107 | 10/1984 | Fed. Rep. of Germany . |
| 3308413 | 10/1984 | Fed. Rep. of Germany . |
| 3326962 | 2/1985 | Fed. Rep. of Germany . |
| 2155848 | 5/1973 | France . |
| 2560805 | 9/1985 | Japan . |
| 1372327 | 10/1974 | United Kingdom . |
| 2135230 | 8/1984 | United Kingdom . |

OTHER PUBLICATIONS

Primary Examiner—Dirk Wright
Attorney, Agent, or Firm—Karl F. Ross; Herbert Dubno

[57] ABSTRACT

A multi-axial industrial robot having a compact modular design for the drive system, which can be varied in numerous ways. The robot consists of a column or stand (1), with a rocker arm (7) swingably supported thereon and an outrigger (9) swingably supported on the rocker arm. The modular construction system is achieved by locating in the rocker arm (7) the oscillatory drive (26) for the outrigger (9), as well as the oscillatory drive (16) for the arm itself. Preferably, in the rocker arm are housed the complete drives (16, 26) with only the off-drive members (21, 31) protruding outwardly. Off-drive members (21, 31) are centered and connected non-rotatably with the stand (1) and the outrigger (9). As a result, the rocker arm (7) rotates about the fixed off-drive member (21) with respect to the housing. Drives (16, 26) consist each of a motor (11, 13) and a two-step timing-belt drive (17, 20 and 27, 30), whose second step can be a gear transmission.

11 Claims, 6 Drawing Figures

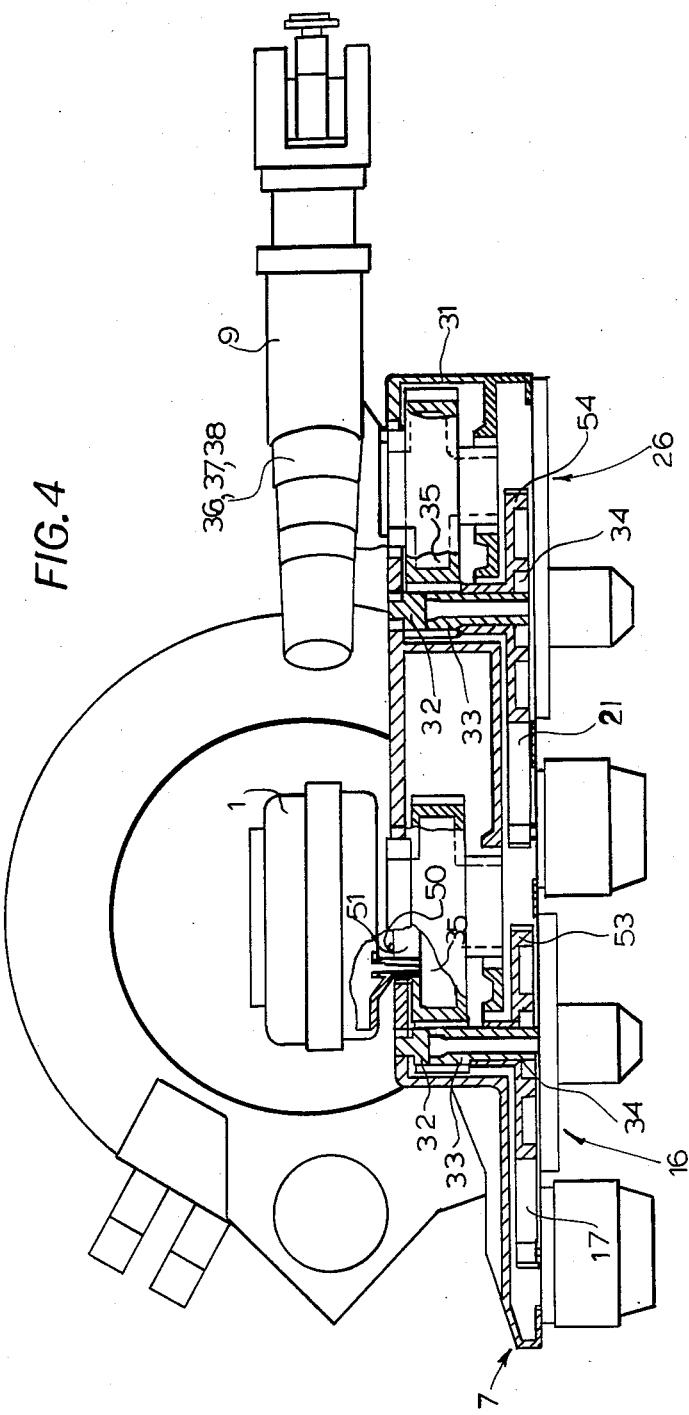

MULTI-PURPOSE INDUSTRIAL ROBOT

FIELD OF THE INVENTION

The invention refers to an industrial robot (manipulator) for various purposes, comprising a stationary base, a rocker arm swingably mounted thereto and an outrigger swingably supported on the rocker arm, whereby the drive for the actuation of the oscillation of the outrigger is located on the rocker arm and the rocker arm, with the weight of the outrigger, is at least approximately statically balanced with respect to its oscillation axis.

BACKGROUND OF THE INVENTION

An industrial manipulator as aforedescribed is known from the German open application No. 31 15 061. There, the drive for the rocker arm is mounted in the base and the rocker arm is balanced by a counterweight. This industrial manipulator is built for manipulating heavy loads and, primarily, it is conceived as a welding manipulator.

Industrial manipulators are however increasingly being used for assembly purposes and therefore are being aquired in larger quantities. For these purposes, where generally smaller loads are to be manipulated, the industrial manipulators can be built lighter, but have to be more economical than the heretofore known manipulators, because of the higher numbers of manipulators used.

The heretofore known manipulators, such as the one according to German open application No. 31 15 061, can be adjusted to the mentioned purpose only within limits. The use of these manipulators is particularly uneconomical, since they were conceived as individual constructions for a single specific purpose.

It is the object of the present invention to develop an industrial manipulator which can be adjusted economically to be used for various purposes.

SUMMARY OF THE INVENTION

The robot is economical to manufacture because it is constructed in a modular fashion easily permitting adjustment to achieve the desired function. The core module is the rocker arm which remains the same for all purposes and therefore can be produced in correspondingly large series in an economical manner. The rocker arm is then combined, according to the purpose of use, with various stands and/or outrigger arms. By changing the location of the drive motor for the drive of the oscillatory motion of the arm to the rocker arm itself, the stationary base can be designed simply and cheaply.

Generally, there has to be a standardization of the separation lines between the stands and the rocker arm, on the one hand, and the rocker arm and the outrigger, on the other hand. As a result the outrigger and the stationary base, as well, can be conceived as components of an assembly, independently from each other and combinable with each other over the rocker arm. The manipulators optimally adjusted to their task have thereby only the exactly required number and kind of axes, which makes them very economical. The modular construction made possible by the rocker arm design also permits an economically advantageous exterior revamping of the industrial robot according to the invention, for other tasks.

The above-mentioned advantages are of importance not only in a modular construction system, but also in a universal individual model of, for instance, a six-axes industrial manipulator. The change of the location of oscillation drives for the rocker arm and outrigger, to the rocker arm, simplifies the design for the outrigger and the stationary base.

Insofar as the oscillation drives of the main arm and the outrigger have transmissions, parts of these transmissions can also be located in the stand, respectively the outrigger, with corresponding standardization. However, it is particularly advantageous when the rocker arm, as a complete subassembly, totally incorporates the mentioned oscillation drives, and only the two off-drive members of the two oscillation drives protrude outwardly.

In the shown embodiments, which are particularly economical, the drive-off members are standardized wheel flanges with a centering means, which have only to be screwed to the stand or the outrigger. If, as a variation, planetary gears or the like are used, the outer hollow wheel, for instance, or the planet carrier can be provided as a drive-off member and be connected to the stationary base and the outrigger, respectively.

The oscillation drives of rocker arm and outrigger can be built in the various ways. For instance, a geared motor can be provided, which makes a stepdown gearing superfluous, and thereby sits directly on the respective oscillation axis. For reasons of free play and of precise control of the oscillation drive it is however advantageous to provide an oscillation drive consisting each of a drive motor and an at least two-step gear, and thereby to provide as a first step a timing-belt drive. The second gear step can be, corresponding to the shown embodiment, also a belt-drive gearing or a toothed-wheel gearing. Also, the entire gearing can be built as a toothed-wheel gearing.

The arrangement of two timing-belt drives each with an intermediate shaft, in groups arranged one after the other on the same level, has the added advantage of a reduced over-all size of the arm housing. Further, this arrangement facilitates the balancing of the main arm, primarily due to the location of the drive motor. Depending on the load of the various outriggers with their tools, additional counterweight can be used for the balancing of the rocker arm around its oscillation axis. It is also possible to balance the main arm with additional weights by use of springs acting upon crank arms or with cylinders actuated by pressure media or the like. The two-step characteristic of the oscillation drive has also advantages with respect to the motion pick-up. In order to eliminate the erroneous influence of stepped up gearing tolerances, the motion pick-up has to be located as closely to the off-drive side as possible. In the oscillation drive of the rocker arm itself, the off-drive member, non-rotatably connected to the stand, represents the reference point. Depending on the constructions of the stationary base, the reference is either relatively or absolutely fixed, and the gearing entraining the rocker arm develops its motion around it. Correspondingly, thereto, the intermediate shaft is the last mobile assembly part, considered on the off-drive side, to which advantageously the motion pick-up is fastened. For reasons of uniform construction, it is also recommended to mount the displacement pick-up on the intermediate shaft of the oscillation drive of the outrigger, although here the off-drive member is the last mobile gearing part.

The mentioned transmission concept brings with it the partial problem of accurate tensioning of the two-stepped timing-belt drives. In the first gearing step, it is easy to have the drive motor adjustably arranged and therefore allow for the tensioning of the belt-drive of the first gear step. In the second gear step, this poses more problems. For this situation, the invention purposes to support the intermediate shaft in a housing part which is eccentrally off-settable with respect to the housing and to use the eccentric displacement for the tensioning of the second belt-drive gearing.

On the other hand, the invention offers the possibility to provide the respective second gearing step with an arrangement, similar to that already proposed for counterbalancing the play of the gear-tooth system, in connection with separate drive pinions, torsionally braced against each other. Such a proposal, for instance, is made in previous patent applications Nos. P 31 15 061 and P 33 08 413. Reference is made to the subject matter of these previous patent applications. According to these, it is particularly suitable to build the respective last step of the gearing as a so-called steel step, which can be relied upon to keep under control vibration problems occurring while performing quick movements with heavy loads.

It is a preferred embodiment to build the off-drive members of the oscillation drives for the arm and the outrigger as hollow bodies. This way, a passage is created for the arrangement of energy supply- and control conduits, tools and the like. As a consequence, there is achieved a compact construction wherein the energy supply is not hindered by the gearing system. The mechanical flange cutting line of the module corresponds to the respective plug- or connecting strip separation line of the electrical circuit.

The overhung bearing of the outrigger and the main arm also have the advantage of a low-cost construction and of a wider working range for the industrial manipulator. Since industrial manipulators according to the invention are also suitable for the manipulation of heavy loads, bilateral fork bearings or the like can also be used.

The two overhung bearings also offer the advantages of being simple and economical modular construction systems. These benefits derive from the ability to freely select the axis position for oscillation of the rocker arm with respect to the stand and of the outrigger with respect to the rocker arm.

The arrangement of the drive motors on one side of the rocker arm and of the overhung bearings on the other side thereof has the advantage of facilitating the balancing of the rocker arm by the drive motors, without influencing the range of operation of the industrial robot.

True to the concept of economy and of the modular construction system, it is also important to build the outrigger as small as possible and correspondingly light. Since the support points of the outrigger and rocker arms, as well as of the rocker arm and stand are located on the same side of the rocker arm, the outrigger can have only a limited length. Thereby, the outrigger, just as well as the rocker arm, has to be balanced with regard to its oscillation axis. German open application No. 30 48 067 solves this problem by arranging the drive motors for the drive of the hand robot beyond the oscillation axis of the outrigger. Spatially the drive motors are thereby farther from each other than their respective the hollow shafts. For the solution of this problem, it is also known from the mentioned German open application to connect the respective hollow shaft with the thereto assigned drive motor via an intermediate shaft with two cardanic bearings. This again considerably increases the overall length of the outrigger.

In order to solve these problems, it is proposed according to the invention to arrange the drive motors in a fan-like manner. Only short, straight intermediate shafts are thereby required to connect the drive motors with the corresponding bevel gear on the respectively assigned hollow shafts. This construction type has, in addition to length reduction, the further advantage of providing the possibility of a simple plug connection between the drive motors and their intermediate shafts, which facilitates a simple replacement of the drive motors. The conformation of the outrigger according to the invention can advantageously be used in a wide variety of industrial manipulators. the ones built according to the invention.

BRIEF DESCRIPTION OF THE DRAWINGS

Details of the invention will become more readily apparent from the drawing. Therein, the invention is illustrated schematically and by examples. It shows.

DETAILED DESCRIPTION

Figure 1:
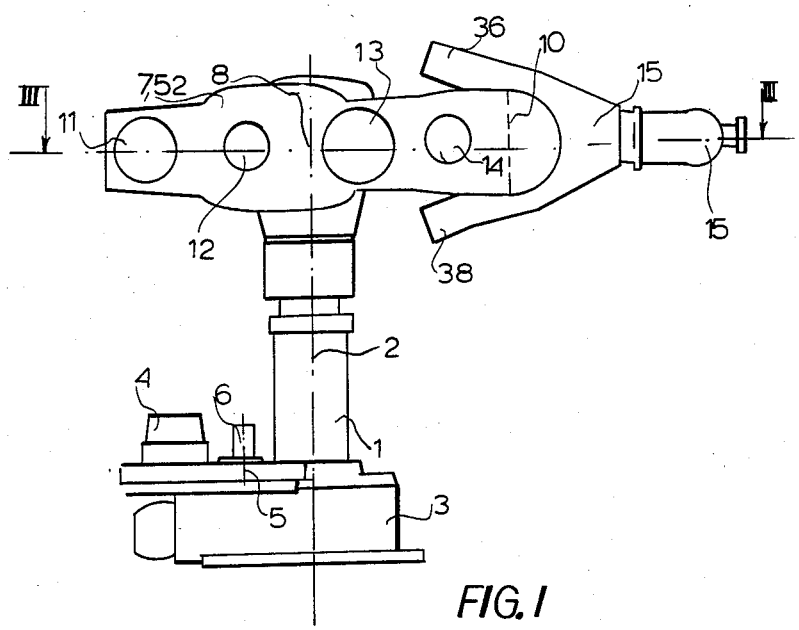
FIG. 1 a sideview of an industrial robot (manipulator) with a rocker arm and an outrigger swingable around horizontal axes, FIG. 2 a side view of an industrial robot with rocker arm and outrigger swingable around vertical axes, FIG. 3 a horizontal section along the lines III—III of the arrangement according to FIG. 1, FIG. 4 a horizontal section similar to FIG. 3 taken through a variant of FIG. 1, FIG. 5 a side view of the outrigger and FIG. 6 a vertical section through the outrigger according to FIG. 5.
Figure 2:
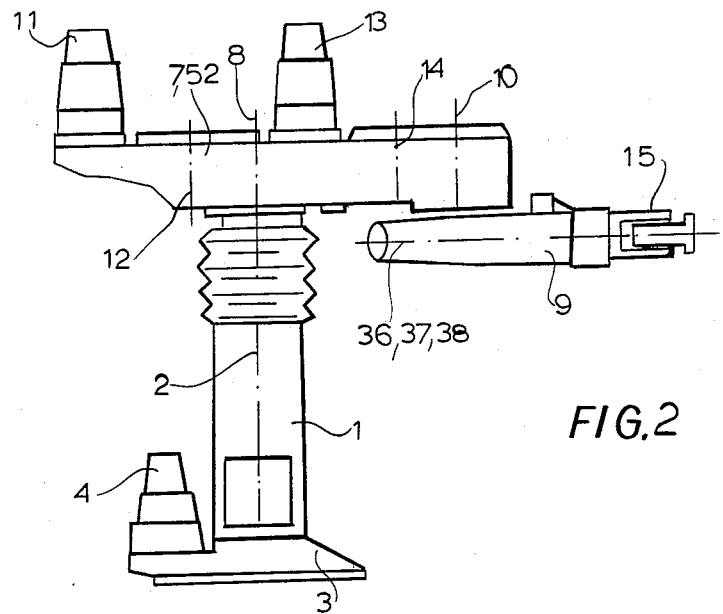

In FIGS. 1 and 2 the basic concepts of an industrial robot (manipulator) are shown, which make it clear that the fundamental idea of the invention can be carried out in different variations, without illustrating all variations of the invention.

In both cases, the stand is an upright column 1 mounted rotatably about a vertical axis 2, to the base segment 3. The column 1 is driven by a drive motor 4, whereby in the case of FIG. 1, a multi-step transmission is used for driving column 1, which is characterized by the symbolically represented intermediate shaft 5 and a motion pick-up 6. This motion pick-up 6 functions to convey to the oscillation drive the control technique impulses.

At the upper end of column 1, in the embodiment of FIG. 1, a rocker arm 7 is supported swingably around the oscillation axis 8. An outrigger 10 is supported thereon, to swing around the oscillation axis 10, and carrying at its free end a so-called hand 15, which, by using one or several axes, can be instrumental in the control of the specialized movements of a tool.

The drive motor 11 required for driving the oscillatory motion of the rocker arm is in a counterweight position to the outrigger 9, with reference to the oscillation axis 8. This drive motor 11 is flanged to the housing 52 of the rocker arm 7. Drive 13, required for driving the oscillatory motion of the outrigger 9 is located close to the oscillation axis 8. Selecting the best location for the drive motor 13 depends on the weight distribution of the outrigger 9 and the drive motor 11 in connection with the thereto assigned lever arm of the rocker arm 7.

When a uniform type of rocker arm 7 is used in a modular construction system, various loads of the outrigger can be counterbalanced through additional weights.

Additionally, FIG. 1 shows symbolically that between each of the drive motors 11, 13 and the oscillation axes 8, 10 corresponding thereto, an intermediate shaft 12, 14 is provided, over which a two-step drive can be actuated.

In the example of FIG. 2, it is shown that the rocker arm 7 and the outrigger 9 can also be supported around vertical or, in special cases, inclined axes 8, 10. This type of support results basically from the special task selected for the industrial manipulator.

In FIG. 2, column 1 is constructed to be a lifting column, whereby the motor 4 drives a spindle (not shown in the drawings) over a reducing gear, which spindle extends along the axis 2. Due to the rotation of the spindle, a spindle nut (also not shown) on which the rocker arm 7 is supported, is lifted and lowered.

In other embodiments, the base stand 1 can be a single- or multiaxial displaceable and/or swivellable sliding carriage connected to the ground, or a gantry or the like. The stand can also be immobile and consist, for instance, only of a wall.

In the same manner, the outrigger 9 can be built in different ways and can guide a wide variety of tools or even further outriggers. The industrial manipulator is suitable for a broad range of purposes and can have as many axes as desired. The shown embodiments are light constructions and particularly well suited for assembly operations or as light welding manipulators. For the manipulation of bigger loads, correspondingly adjusted heavy-duty embodiments can be used.

Figure 3:
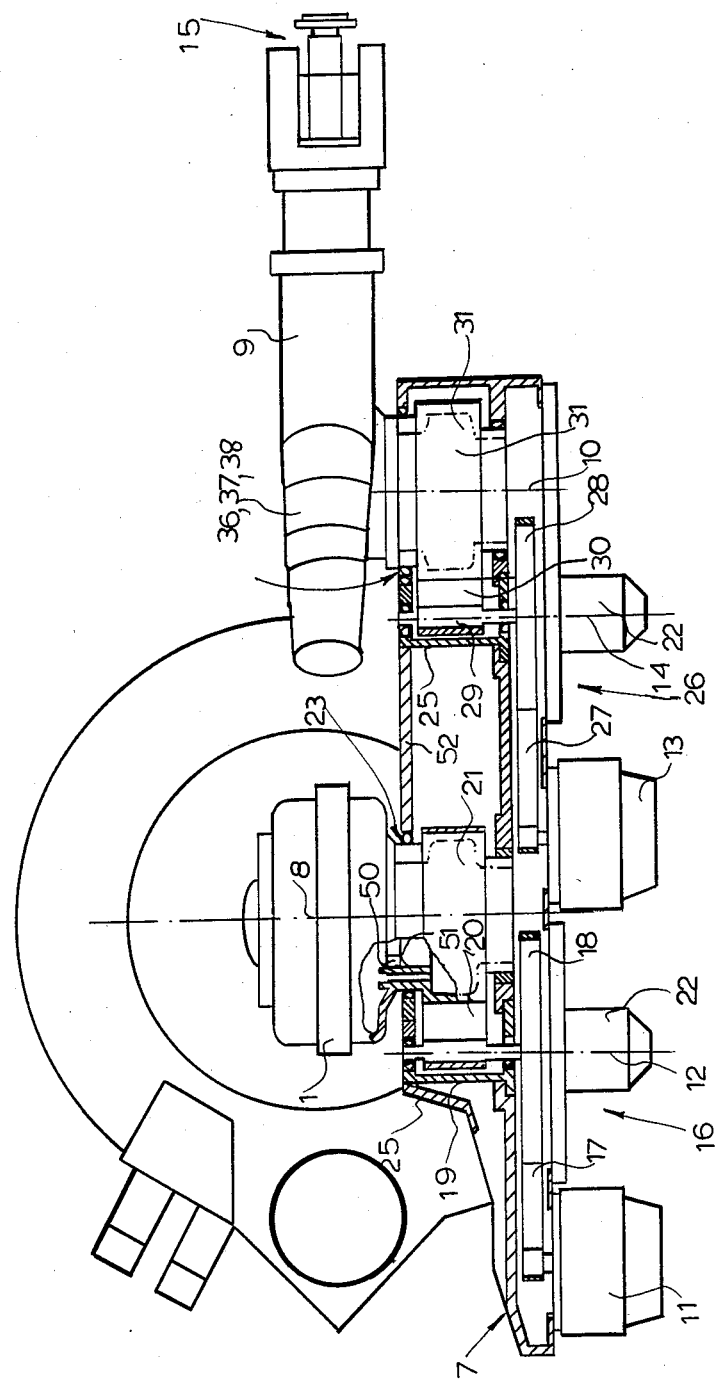
Figure 6:
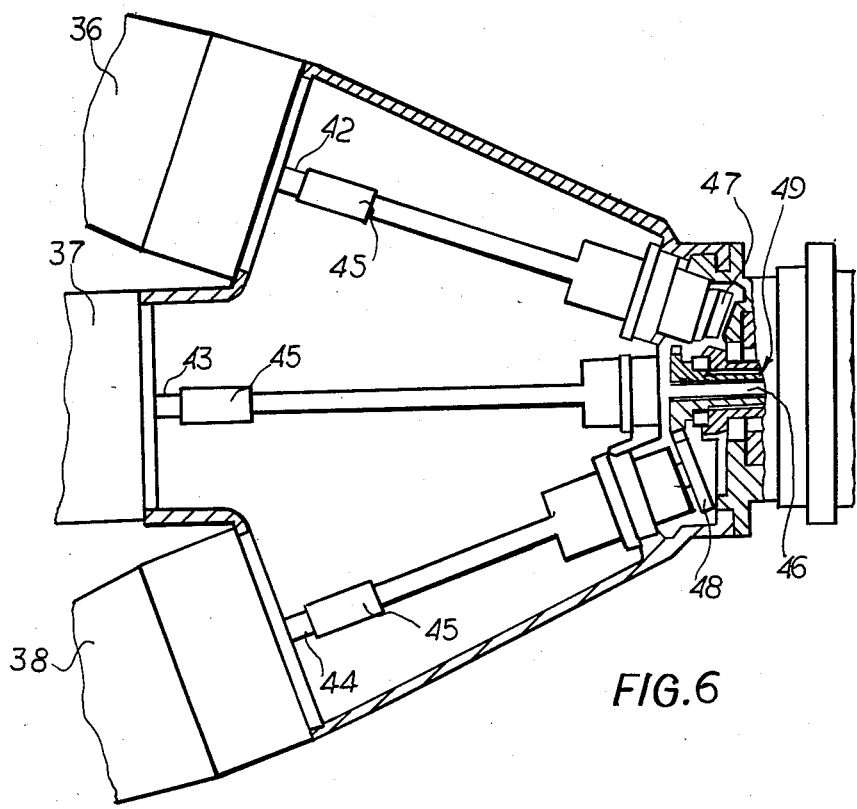
Figure 7:
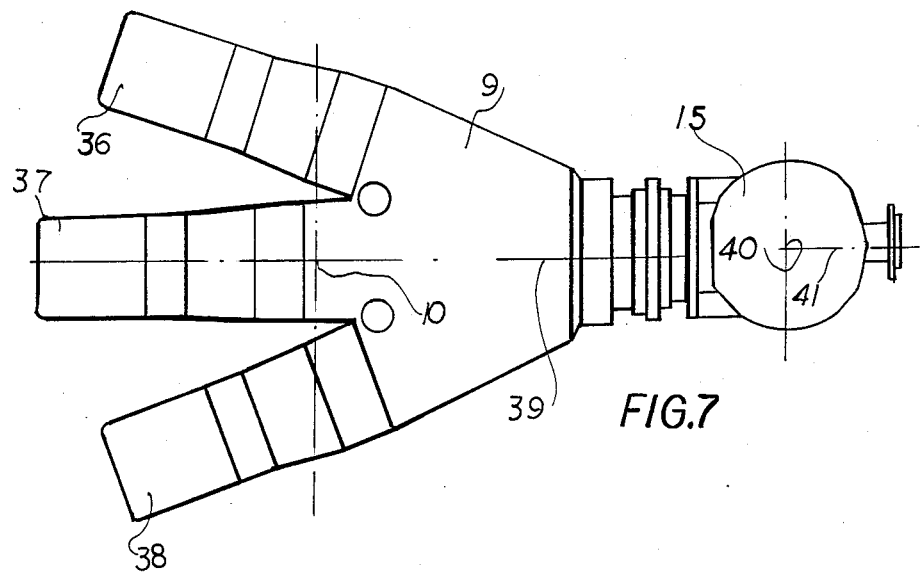

The embodiment FIG. 3 depicts the rocker arm 7 it results that the rocker arm 7 having a housing 52. This housing 52 is supported on the column 1 via an overhung bearing 23. Also, the outrigger 9 is supported on the arm 7 via an overhung bearing 24. As a result, the plane of motion of the outrigger 9 is laterally offset with respect to the plane of motion of the rocker arm 7. On the other hand, this leads to the advantage that the drive motors 11, 13 can be flanged to the side of the rocker arm 7 which is opposite to the overhung bearings 23, 24. This way, a free space for the movement of the outrigger 9 is created, whereby the drive motors 36, 37, 38, to be provided for further axes, can be arranged in a fan-like manner in the plane of motion of the outrigger 9, as shown by FIGS. 5 and 6.

In the embodiment of FIG. 3, the complete set of oscillation drives 16, 26 for the oscillating motion of the rocker arm 7 and the outrigger 9 is arranged within the housing 52 of the rocker arm 7. The oscillation drives 16, 26 are built alike and consist respectively of the drive motors 11, 13, as well as of a two-step transmission 17, 20 and 27, 30.

Each first transmission step utilizes a timing-belt drive 17, 27, over which the drive motors 11, 13 drive the intermediate gears 18, 28, sitting on intermediate shafts 12, 14. On each of the intermediate shafts 12, 14, on the motor side of the rocker arm 7 a motion pick-up 22 is located, which transmits the control impulses to the drive motors 11, 13 in the known manner.

In the embodiment of FIG. 3, the second transmission step also utilizes a timing-belt drive 20,30, which acts via a drive gear 19, 29 upon an off-drive member 21, 31 in the form of an off-drive gear. The off-drive members 21, 31 are rotatably supported in the rocker arm housing 52 and protrude from the housing 52 on the side opposite to the motors 11, 13. As can be seen from FIG. 3, the off-drive members 21, 31 have each a wheel flange 51 on the outside and a centering 50, through which they are non-rotatably connected with column 1 and the stand in general and are connected, particularly by screws, to the outrigger 9. The screw connections are thereby accessible through column 1 the outrigger 9.

The stationary base or column 1 are relatively or absolutely fixed, depending upon their own degree of freedom. If there is a non-rotatable connection between the off-drive member 21 and the column 1, the off-drive member 21 is as a result relatively or absolutely fixed. This leads to the toothed belt drive 20 running its course around the fixed off-drive member 21, and thereby rotating the rocker arm 7 around the off-drive member 21 and the axis 8. Overhung bearing 23 of the rocker arm 7 with respect to the column 1 is thereby formed through the support of the off-drive member 21 in the rocker arm housing 52.

The outrigger 9 is relatively free moving with respect to the rocker arm 7. Through the non-rotatable connection between the off-drive member 31 and outrigger 9, the latter is rotated when its oscillating drive 26 is actuated. The oscillatory drives 16 and 26 are thus identical in construction, but have opposite kinematic action. Also in the case of the outrigger 9, the overhung bearing 24 is formed by the support of the off-drive member 31 in the rocker arm housing 52.

Tensioning of the timing-belt drive 17, 27 is accomplished, according to the invention, due to the fact that the motors 11, 13 on the drive side are guided offsettably in the housing 52 of the rocker arm 7. Thereby, the tensioning of the belt drives 20, 30 of the respective second steps is, however, not influenced. In order to produce this tensioning, the eccentric housing parts 25 are provided, wherein the bearing of the drive gears 19, 29 is supported. With the aid of this eccentric displacement, the toothed belt of the second transmission step 20, 30, can be tensioned. Since this causes also a change in the position of the intermediate shaft 12, respectively 14, the tensioning of the timing-belt drive 17, 27 of each of the first transmission steps is performed only thereafter, through displacement of the corresponding drive motors 11, 13.

In the embodiment exemplified in FIG. 4, it is shown that the second transmission step for the oscillating drives 16, 26 of the arm 7 and the outrigger 9 can also be a steel gearing, namely a spur gear transmission 35. Thereby, two pinions 32, 33, separated from each other, which can be mutually adjusted with the aid of the torsion tensioner 34. This torsion tensioner has concurrently the task to fasten the intermediate gears 53, 54 of the belt drives 17, 27. Both pinions 32, 33, act each in opposite direction upon their assigned off-drive gear 21, 31, which again can be non-rotatably connected with the column 1, respectively the outrigger 9. As a result, in the oscillation drive 16 of rocker arm 7, the pinions 32, 33 run their course along the geartooth system of the off-drive gear 21, and, as a reaction, lead to the oscillatory movement of the rocker arm 7. Further details of this drive construction type can be learned from German Pat. No. 33 08 413.

FIGS. 5 and 6 show a very particular construction of the outrigger 9.

As already shown in FIG. 3, the outrigger 9 is supported in an overhung bearing with regard to the rocker arm 7. The outrigger, however, also has a grasping device 15, which can be characterized by one, two or three axes. It is therefore required to provide drives for all these individual axes.

According to the invention, drive motors 36, 37 and 38 for these axes are arranged directly on the outrigger 9 in a fan-like manner, so that their drive axes are in the plane of oscillation of the outrigger 9. This way, it is insured that drive motors 36, 37, 38 do not collide during the swinging of the outrigger 9 with the rocker arm 7, the column 1 or the like. In the example of FIG. 5, hand 15 is symbolically represented and has an oscillation axis 40 in the sense of a hand-robot axis and a rotation axis 41 in the sense of a finger-rotation axis. This rotation axis 41 is in stretched position coaxial to the rotation axis 39, about which the grasping device 15 is rotatable with regard to the outrigger 9.

In the example of FIG. 6, it is shown how the arrangement of FIG. 5 can be put in practice from the point of view of transmission techniques. For this purpose it is provided that the individual driving shafts 42, 43, 44 of the drive motors 36, 37, 38 lead to coaxial shafts with plug connections 45. It is recommended that the middle drive motor 37 act directly upon the driving gear 46 via its drive shaft 43. The two other drive motors 36 and 38 act over angular-drive bevel gear sets 47, 48 upon thereto assigned hollow shafts. The totality of shafts forms a shaft arrangement 49.

The concept according to the invention has the advantage that the grasping device 15 to be moved, can be moved within a range considerably larger than heretofore known. In addition, this advantage is achieved with a transmission construction which allows a manifold variation of the manipulator.

We claim:

1. Industrial robot for various purposes comprising a stand, a rocker arm oscillatingly supported thereon, an outrigger oscillatingly supported on the rocker arm, and a firstr and second drive for oscillating said arm and outrigger, respectively, whereby a drivemotor of said second drive for oscillating the outrigger is located on the rocker arm, and the rocker arm is at least approximately balanced statically with respect to an oscillation axis by the weight of the outrigger wherein the improvement comprises the drive motor for the first drive being arranged on the rocker arm and a first and second off-drive member of the first and second drives being supported rotatably about said oscillation axis on the rocker arm and connected non-rotatably to the stand, said first and second drives being completely encased in a housing defining said rocker arm and only said off-drive members being directed outwardly through said housing and along the axis of rotation of the off drives and said first and second off-drive members being wheel flanges with a centering means for being screwed to the stand and outrigger, respectively.

2. Industrial robot according to claim 1, characterized by that the oscillation drives of the rocker arm and the outrigger consist each of a motor and a transmission with at least a first and second step, whereby at least the first transmission step consists of a timing-belt drive.

3. Industrial robot according to claim 2, characterized by that both transmissions are two-step timing-belt drives each transmission having an intermediate shaft, said drives arranged one after the other in a common plane.

4. Industrial robot according to claim 3, characterized by that a motion pick-up for control of the first and second oscillation drives assigned to the intermediate shaft is located on the intermediate shaft.

5. Industrial robot according to claim 3 characterized by that the intermediate shafts are located, respectively, in a housing part and said shafts are eccentrically offsettable with respect to the rocker arm housing by a means for tensioning of the timing-belt drives.

6. Industrial robot according to claim 2 characterized by that the respective second transmission step is a gear transmission and is equipped with separate drive pinions torsionally tensioned against each other which are part of an arrangement to counteract play of gear-teeth in said gear transmission system.

7. Industrial robot according to claim 1, characterized by that off-drive members of the oscillation drives are hollow and are shaped to serve as passages for energy supply-and control conduits, tools and the like.

8. Industrial robot according to claim 1, characterized by that the rocker arm is balanced due to the distribution of the drive motors, whereby the drive motor for the outrigger is located close to the oscillation axis of the rocker arm.

9. Industrial robot according to claim 1, characterized by that the rocker arm is supported on the stand and the outrigger is supported on the arm by overhung bearings.

10. Industrial robot according to claim 9, characterized by having a set of support points which are located together on one side of the rocker arm and the drive motors are located on an opposite side of the rocker arm.

11. Industrial robot according to claim 1 characterized by that the outrigger has drive motors arranged in a fan-like manner, for the drive of further axes arranged on the outrigger, whereby the drive axes of the motors are in an oscillation plane of the outrigger.

* * * * *